Dec. 17, 1929.  A. M. ENGLISH  1,739,633
WRAPPING MACHINE
Filed June 20, 1923  10 Sheets-Sheet 3
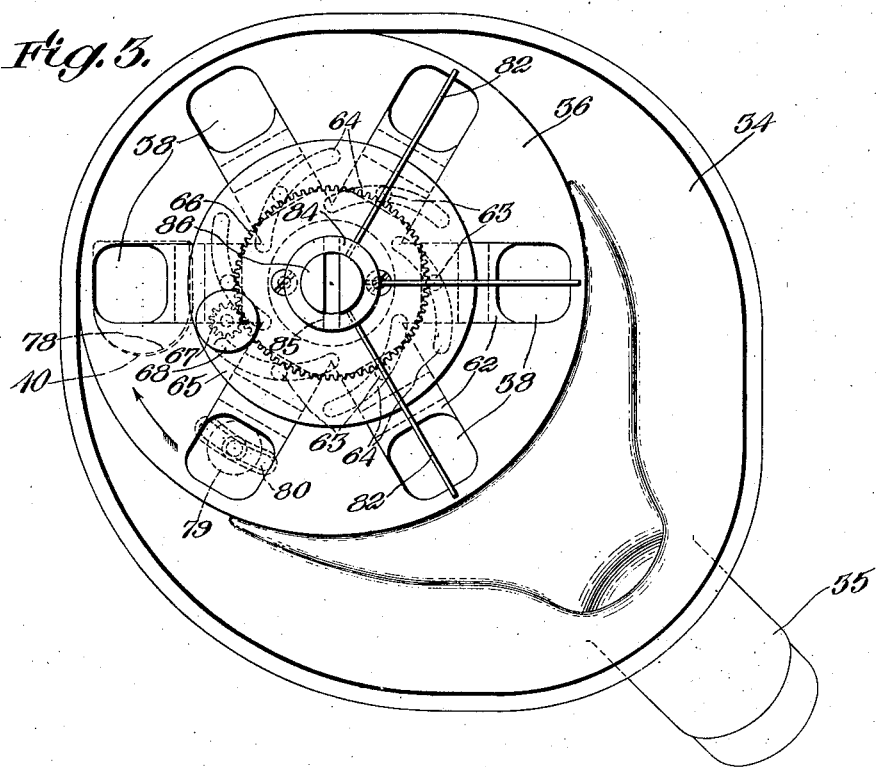
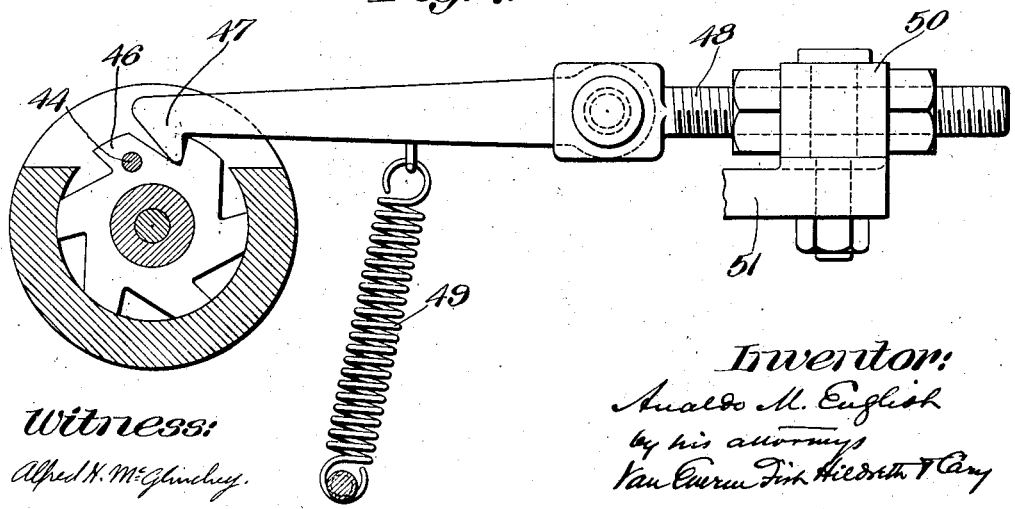

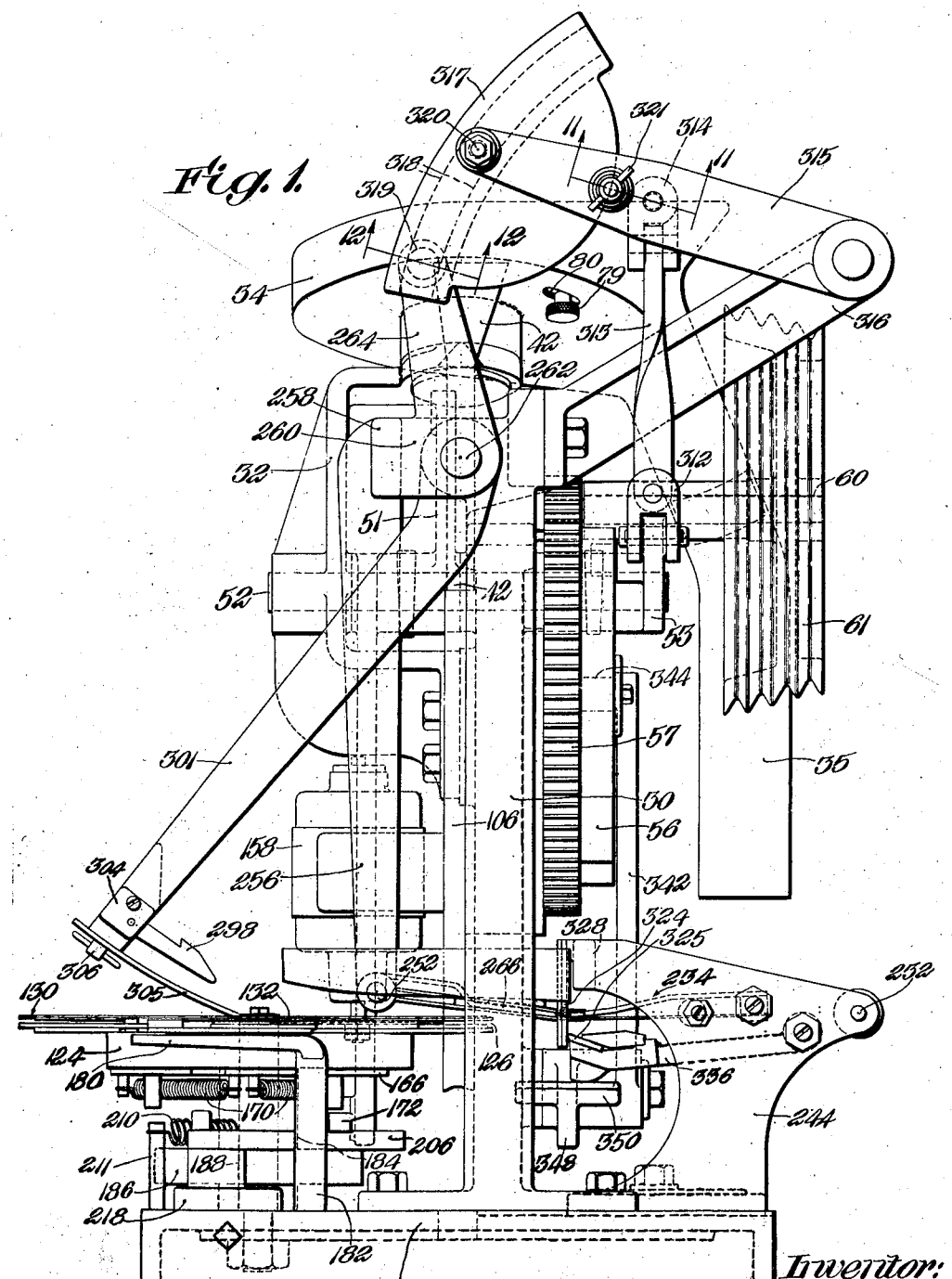

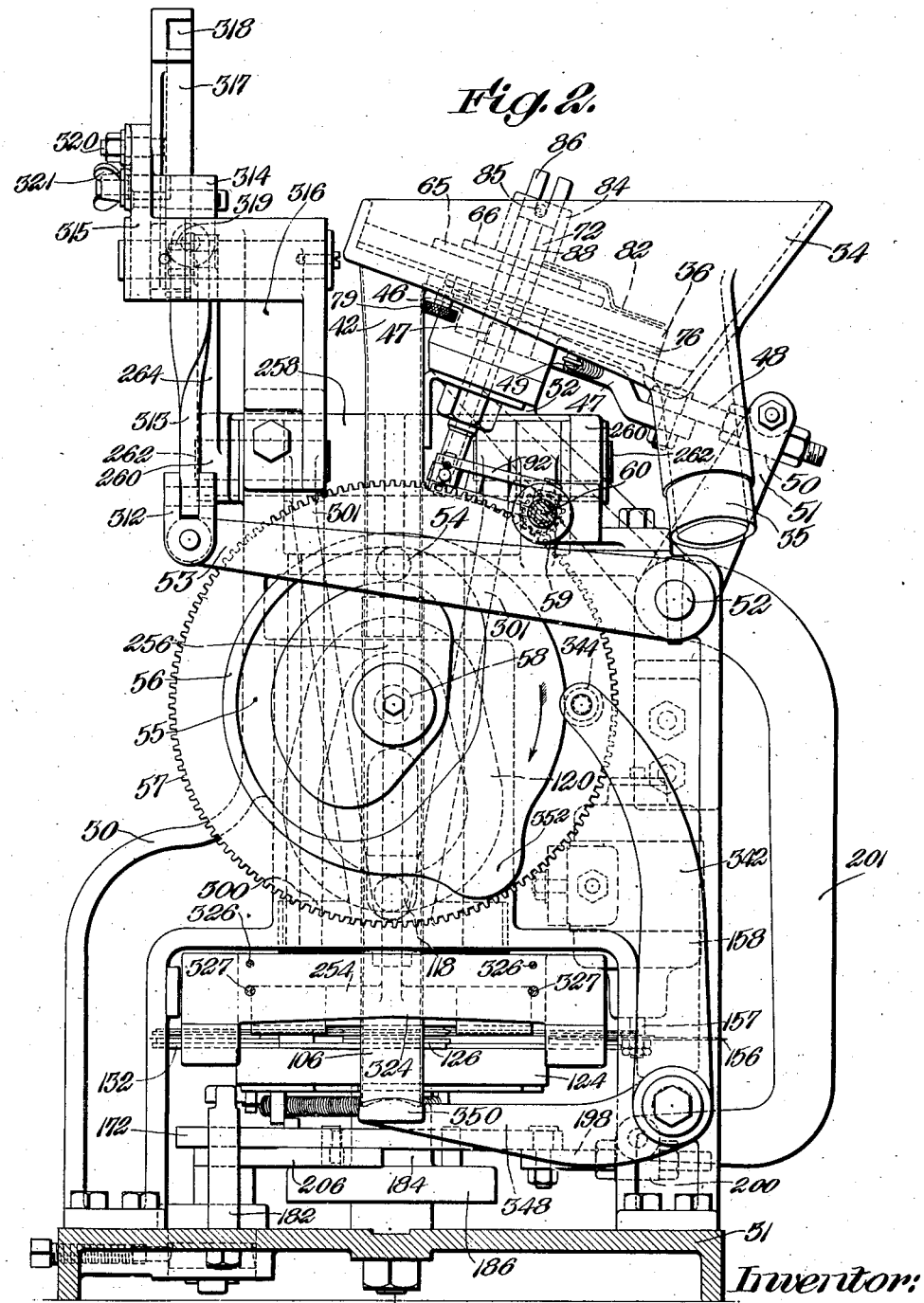

Dec. 17, 1929.  A. M. ENGLISH  1,739,633
WRAPPING MACHINE
Filed June 20, 1923    10 Sheets-Sheet 4
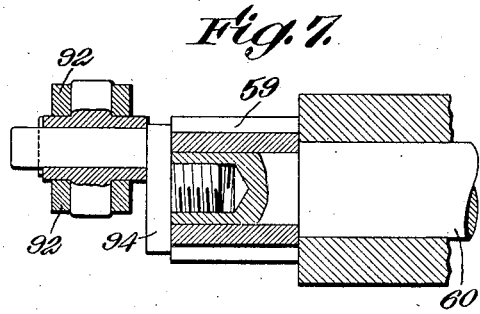
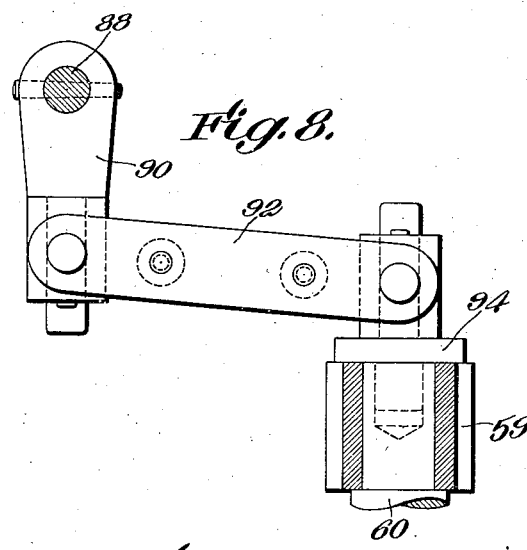
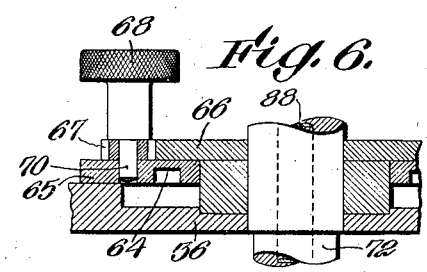
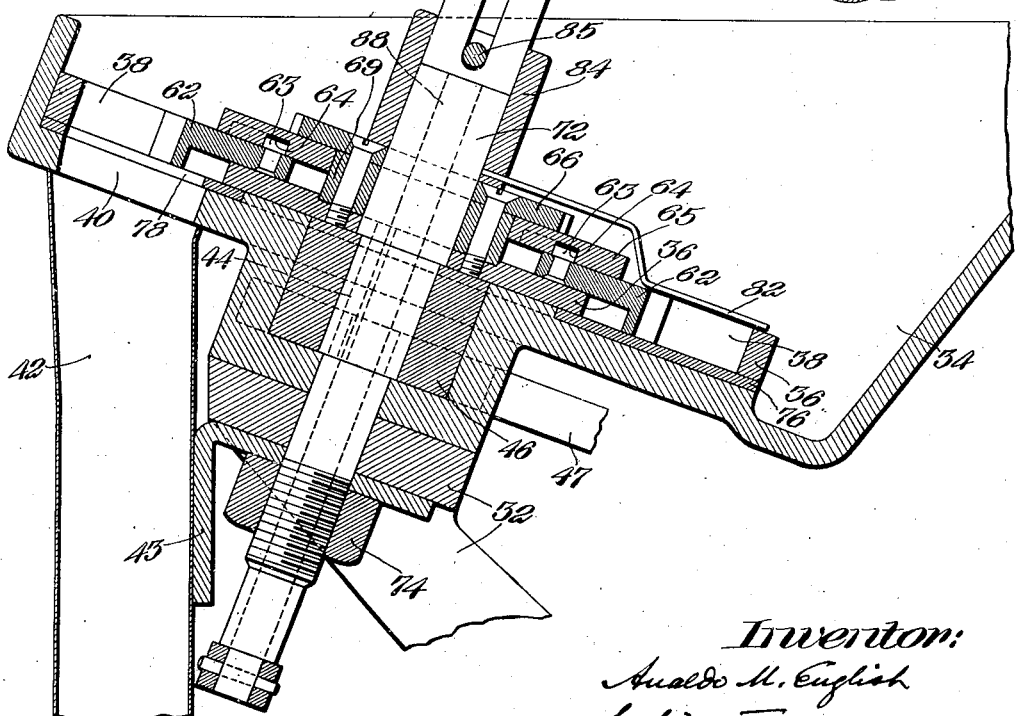
Inventor:
Anoldo M. English
by his attorneys
Witness:
Alfred H. McGlinchey.

Dec. 17, 1929.　　　A. M. ENGLISH　　　1,739,633
WRAPPING MACHINE
Filed June 20, 1923　　10 Sheets-Sheet 5
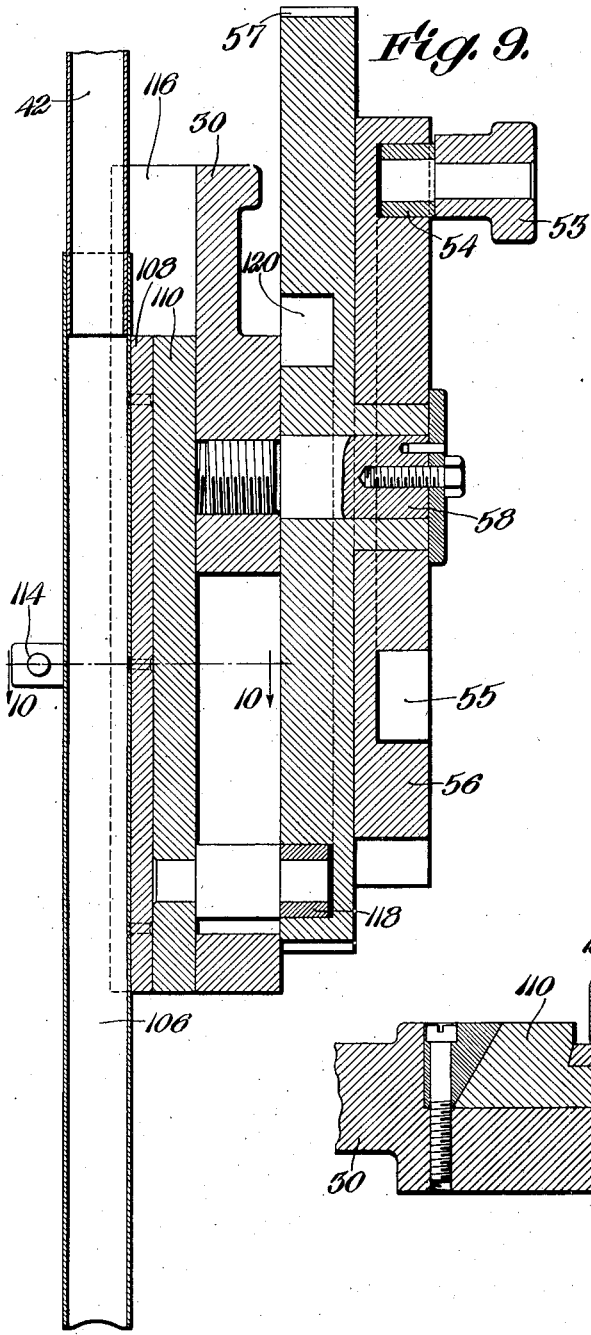
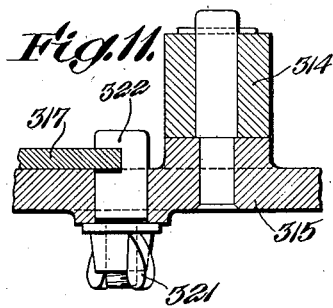
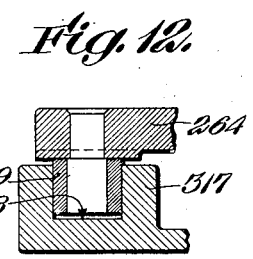
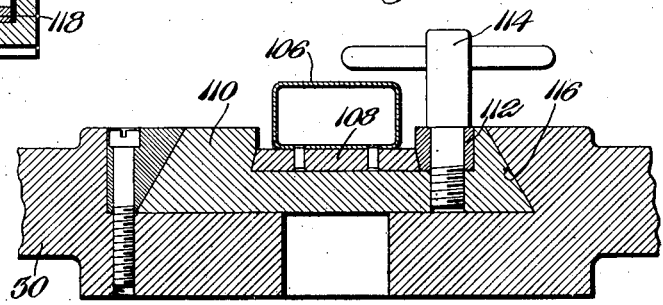

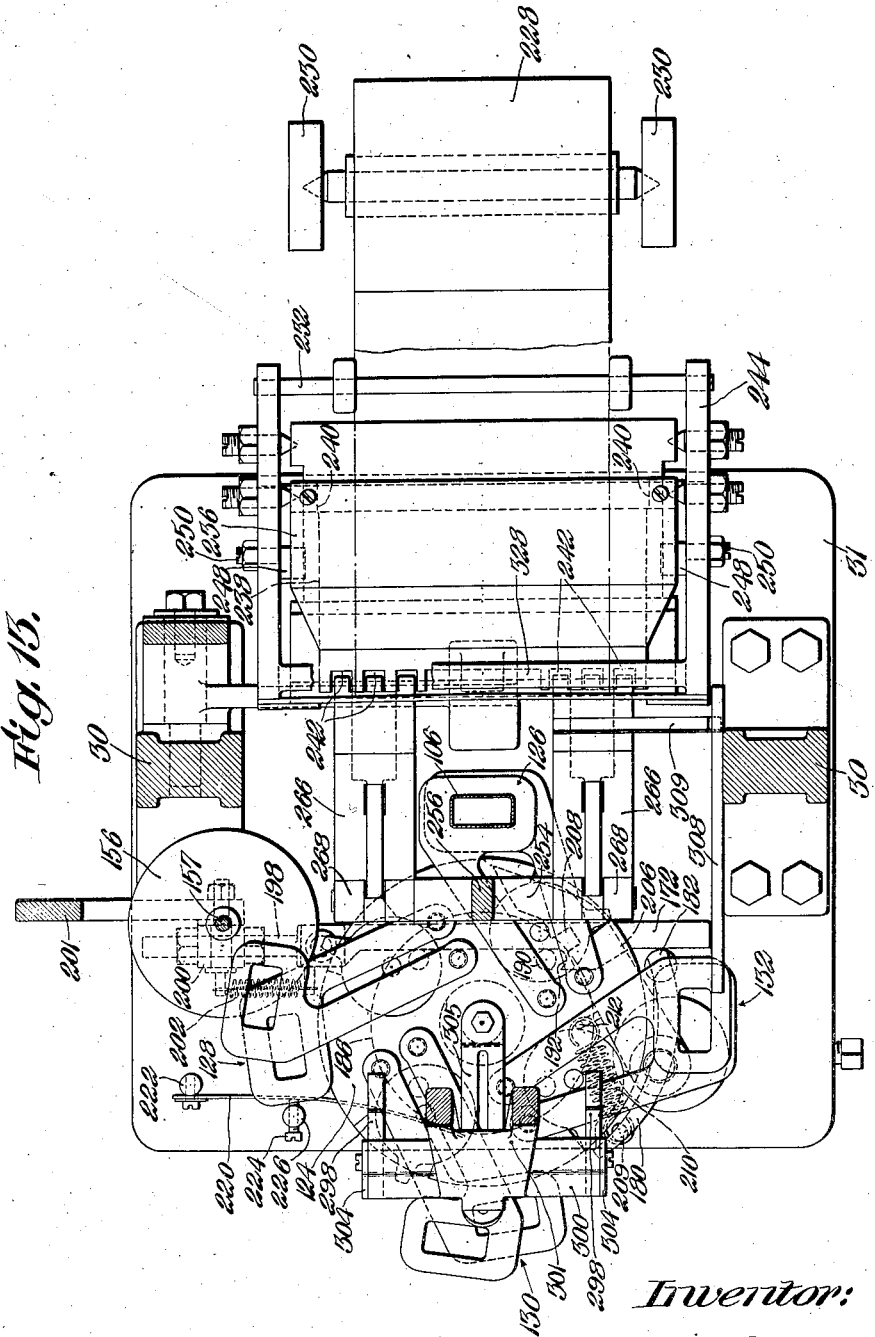

Dec. 17, 1929.　　　A. M. ENGLISH　　　1,739,633
WRAPPING MACHINE
Filed June 20, 1923　　　10 Sheets-Sheet 7
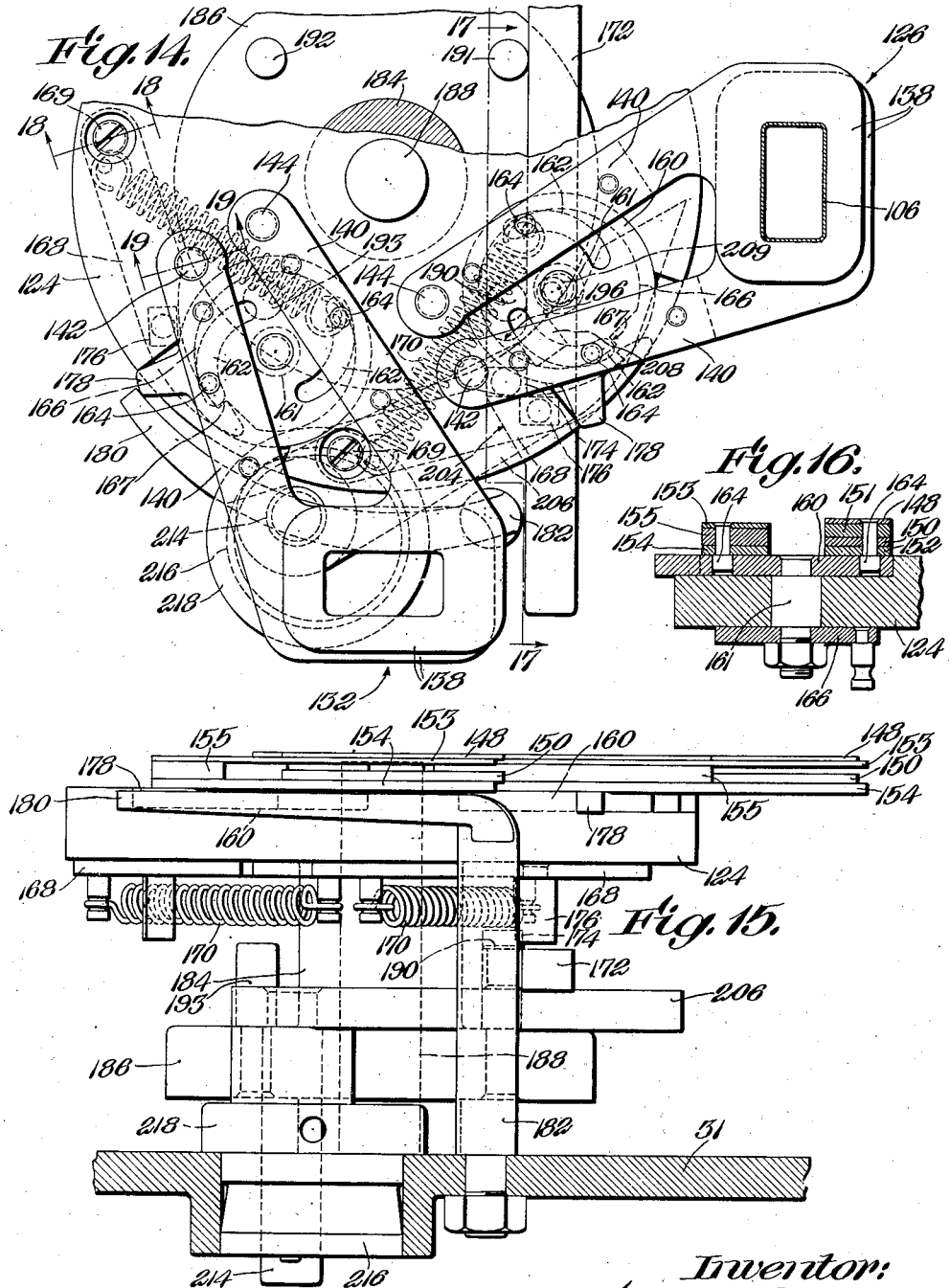

Dec. 17, 1929.  A. M. ENGLISH  1,739,633
WRAPPING MACHINE
Filed June 20, 1923  10 Sheets-Sheet 8
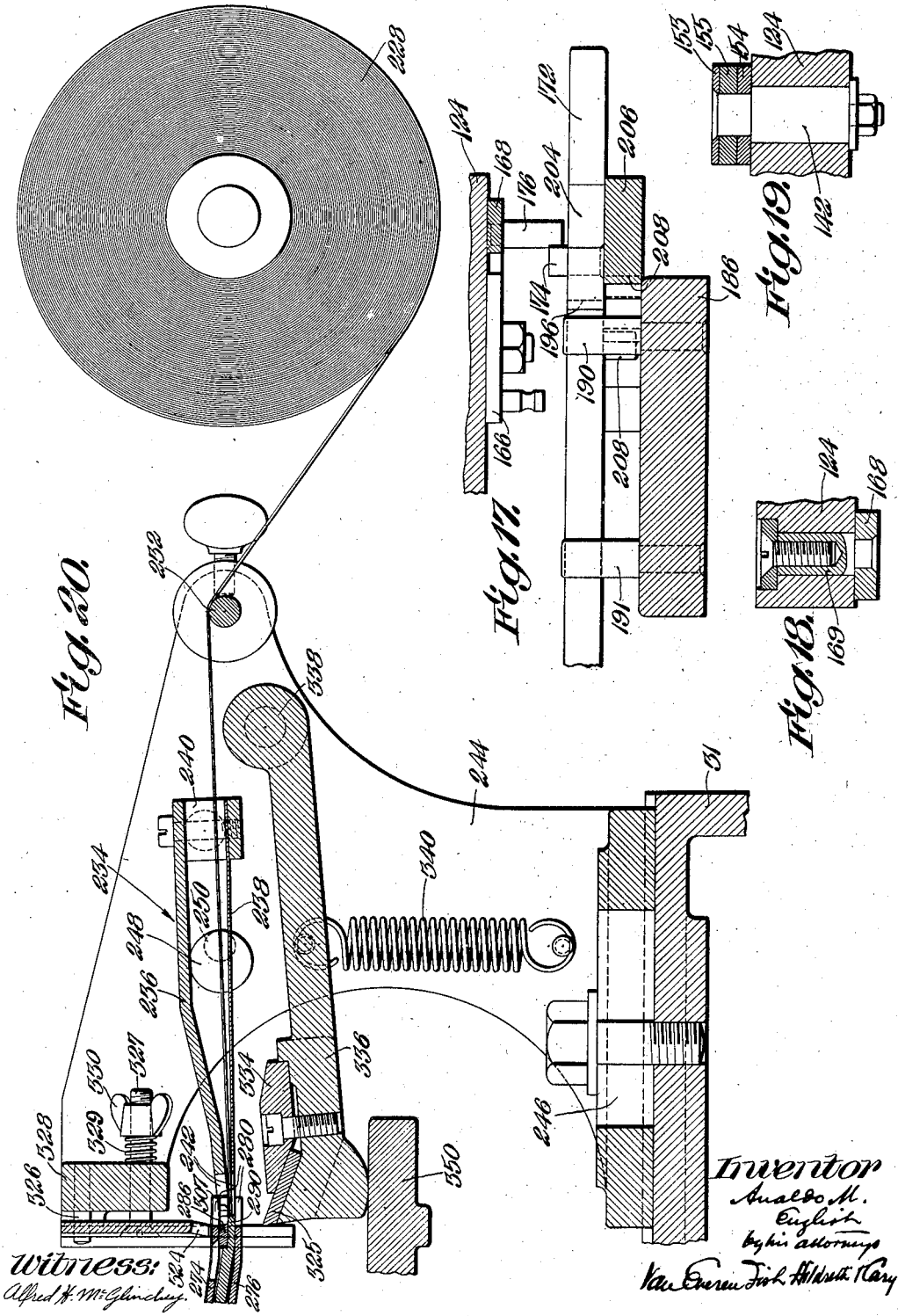

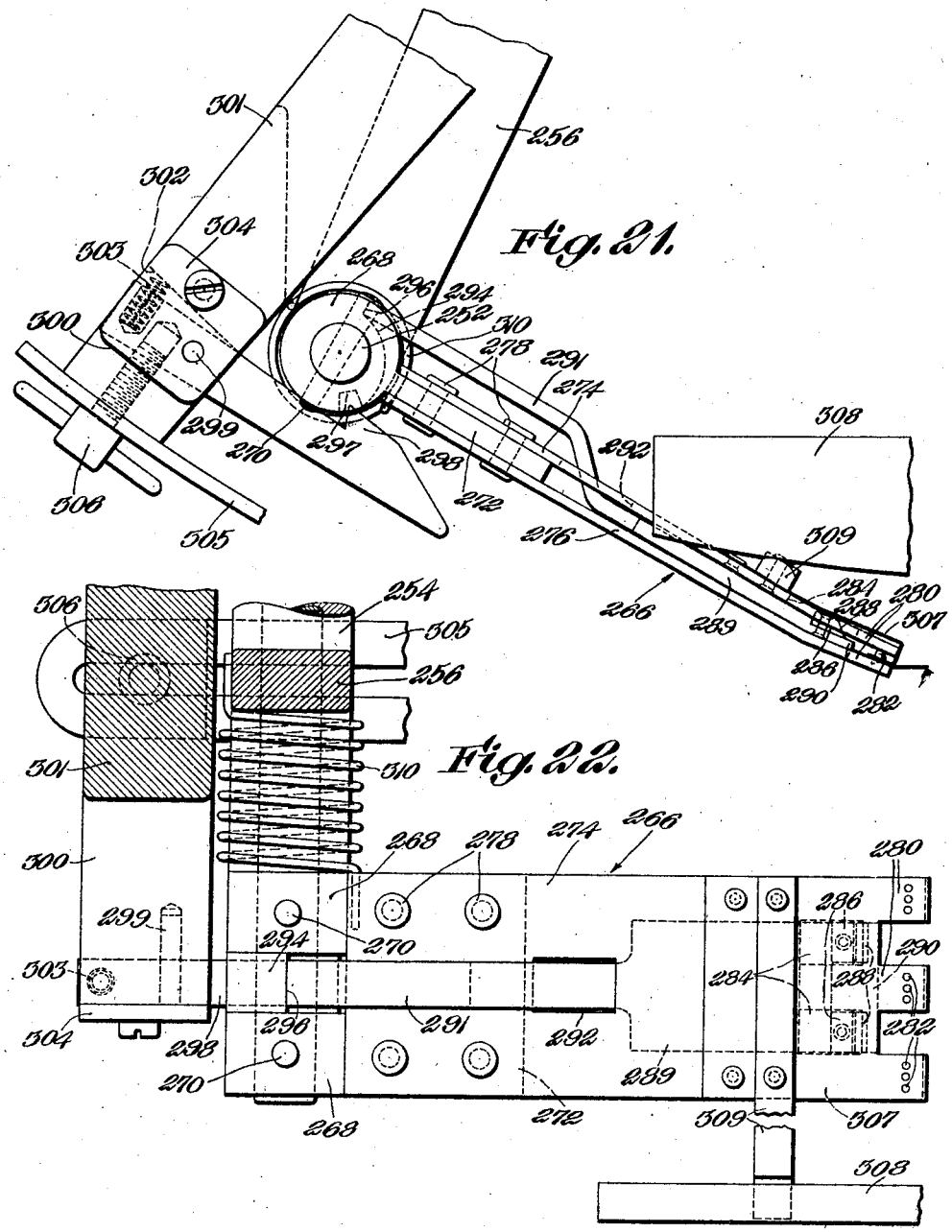

Dec. 17, 1929.  A. M. ENGLISH  1,739,633
WRAPPING MACHINE
Filed June 20, 1923  10 Sheets-Sheet 10

Witness:
Alfred R. McGlinchy.

Inventor:
Ansaldo M. English
by his attorneys

Patented Dec. 17, 1929

1,739,633

UNITED STATES PATENT OFFICE

ANALDO M. ENGLISH, OF BROOKLINE, MASSACHUSETTS, ASSIGNOR, BY MESNE ASSIGNMENTS, TO PNEUMATIC SCALE CORPORATION, LIMITED, OF QUINCY, MASSACHUSETTS, A CORPORATION OF MASSACHUSETTS

WRAPPING MACHINE

Application filed June 20, 1923. Serial No. 646,574.

The present invention relates to wrapping machines and has for its object to provide a machine for wrapping measured amounts of loose material in individual bags or packages. To this end the invention consists of the wrapping machine hereinafter described and particularly defined in the claims.

Figure 23:
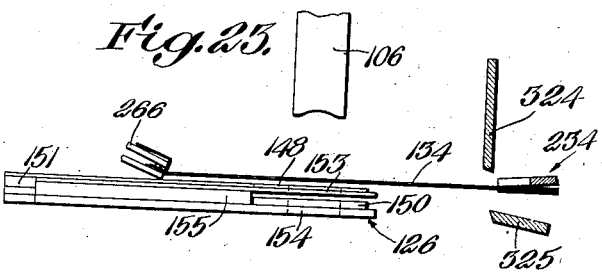
Figure 26:
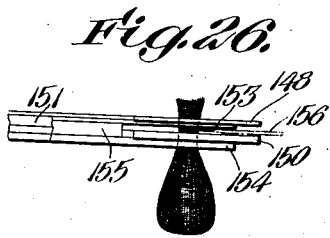
Figure 24:
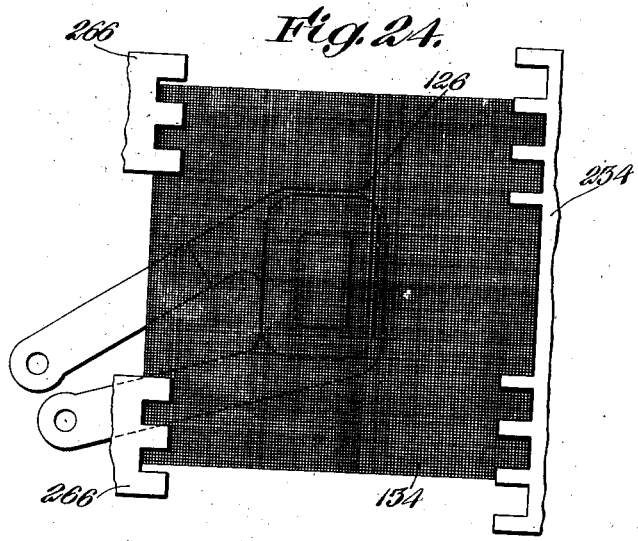
Figure 27:
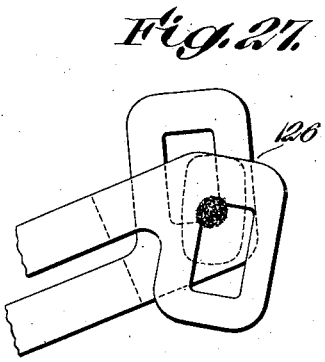
Figure 25:
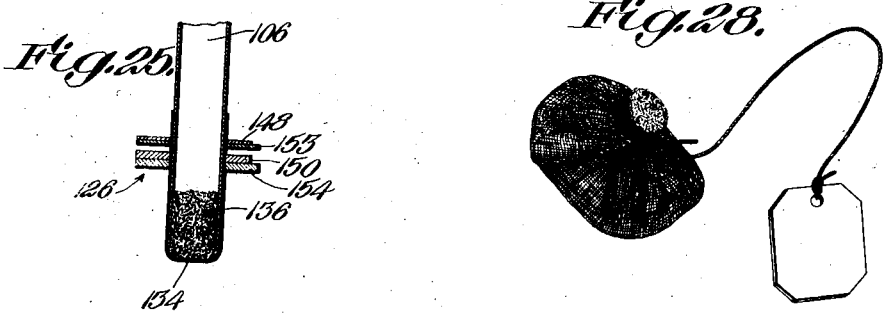
Figure 28:
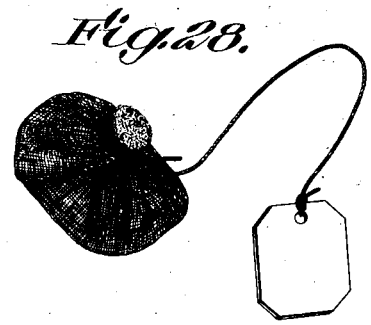

In the accompanying drawings Fig. 1 is a side elevation of a machine embodying the features of the present invention; Fig. 2 is a rear elevation of the machine shown in Fig. 1; Fig. 3 is a plan view of the measuring device; Fig. 4 is a detail of the means for actuating the measuring device; Fig. 5 is an elevation in section of the measuring device shown in Fig. 3; Fig. 6 is a detail showing the means for adjusting the measuring device; Figs. 7 and 8 are details illustrating the means for actuating the leveling fingers; Fig. 9 is a vertical section of the conveying mechanism; Fig. 10 is a section on line 10—10 of Fig. 9; Fig. 11 is a section on line 11—11 of Fig. 1; Fig. 12 is a section on line 12—12 of Fig. 1; Fig. 13 is a plan view showing the wrapper forming device and wrapper feeding mechanism; Fig. 14 is an enlarged plan view of the wrapper forming devices; Fig. 15 is an elevation partly in section of the apparatus shown in Fig. 14; Fig. 16 is a detail to be referred to; Fig. 17 is a section on line 17—17 of Fig. 14; Fig. 18 is a section on line 18—18 of Fig. 14; Fig. 19 is a section on line 19—19 of Fig. 14; Fig. 20 is an elevation in section of the wrapper feeding and cutting mechanisms; Fig. 21 is a side elevation of a portion of the wrapper feeding mechanism; Fig. 22 is a plan view of a portion of the mechanism shown in Fig. 21; Figs. 23 to 27, inclusive, are diagrams illustrating the operation of the machine; and Fig. 28 is a view of the bag-shaped package obtained.

The invention is herein illustrated and described as embodied in a machine for wrapping predetermined amounts of tea to form tea bags for individual service. The wrapper consists of a flat piece of cloth which is depressed to receive the charge of tea and thereafter bunched and tied to form the bag or package illustrated in Fig. 28 of the drawings. To the accomplishment of this end, the machine essentially comprises, first, a measuring device, second, a delivering device into which the charges of tea are dumped from the measuring device and conveyed to the wrapper, third, a wrapper or bag forming mechanism over which the wrapper is drawn and into which the conveying device extends to assist in the formation of the wrapper about the charge of tea, and fourth, a wrapper feeding and cutting mechanism by which predetermined lengths of wrapping material are drawn at regular intervals over the bag forming mechanism in position to be engaged by the conveying apparatus to receive the charge of material.

The illustrated embodiment of the invention is described as follows: The machine frame upright 30 which is secured to the base 31 carries a bracket 32 upon which is mounted the hopper 34 which forms a part of the measuring mechanism. The hopper is provided with an overflow pipe 35. Rotatable within the hopper is a measuring disk 36 having a series of openings 38 arranged near the periphery and of the proper size to hold the desired amount of a single charge of tea. As illustrated in Fig. 5, the hopper is inclined so that the tea first enters the lowermost openings in the disk. The disk is thereafter rotated step by step to bring successive openings above a discharge opening 40 in the hopper which leads into a delivering tube 42, rigidly secured to a bracket 43, which is secured beneath the hopper bracket 32. In order to impart the rotation to the disk, the disk is connected by means of a pin 44 with a ratchet 46, which is engaged at regular intervals by a reciprocating pawl 47 pivoted upon a threaded member 48 and held in engagement with the ratchet by a spring 49 secured between the pawl arm and the hopper. The member 47 is connected through a block 50 with an arm 51 secured to a rock shaft 52 which is journaled in the machine frame. The rock shaft is oscillated by a lever 53 carrying a cam roll 54, which is actuated by a cam groove 55 in a cam 56 secured to the main gear 57 of the machine. The gear 57 is rotated over a fixed stud 58 by a pinion 59 on the drive shaft 60 of the machine, the shaft being driven from any suitable source of power through a pulley 61. By means of the reciprocations of the pawl, the openings 38 are successively advanced into discharge position.

Provision is made for adjusting the openings 38 to measure any desired amount of material. To this end adjustable blocks 62 are provided to slide radially of the disk 36, each of the blocks having a pin 63 engaging a cam slot 64 in an adjusting disk 65 which is rotatable over a collar 69 secured together with a gear 66 to the measuring disk. The gear is adapted to mesh with a removable pinion 67 mounted upon a hand knob 68 and provided with a stud 70 which is adapted to be received in a suitable opening in the disk 65 so that the disk may be accurately rotated by hand to vary the position of the blocks 62. The parts of the measuring apparatus thus far described are mounted around a stationary sleeve 72 which passes through the hopper and the brackets 32 and 43 and is secured in place by a nut 74 which is threaded over the lower end of the sleeve and bears against the bracket 43. In order that the time of discharging into the tube 42 may be accurately adjusted an additional disk 76 is provided beneath the measuring disk 36 and has an opening 78 through which the tea must discharge into the delivering tube 42. The disk 76 may be rotated relatively to the measuring disk by means of a hand screw 79 threaded into the disk 76 and passing through a circular slot 80 in the hopper, so that the size of the discharge opening may be accurately adjusted and also the edge of the discharge opening advanced so that the time of discharge may be correspondingly retarded.

The material after being placed in the openings 38 for measurement is leveled off flush with the top of the measuring disk by means of oscillating leveling fingers 82 which are mounted in a sleeve 84 connected by a pin 85 to the slotted head 86 of a shaft 88 which passes centrally up through the sleeve 72. As indicated in Figs. 7 and 8, the shaft 88 is pinned to a crank arm 90 which is connected through a pitman 92 with a crank 94 mounted in the end of the drive shaft 60, so that the rotation of the shaft 60 oscillates the shaft 88 and the leveling fingers 82, the extent of oscillation of the fingers being approximately the width of one of the openings 36.

It will be observed that the leveling finger sleeve 84 and measuring disk with its appurtenant parts are readily removable from the sleeve 72. Accordingly, a number of measuring disks of different depths may be provided, so that a wide range of adjustment for the amounts of tea to be measured is obtained.

The delivering mechanism by which the tea is carried from the measuring disk to the wrapper consists of the tube 42 and a tube or hollow plunger 106 which reciprocates telescopically over the stationary tube 42, as illustrated in Fig. 9. The tube 106 is riveted to a wedge plate 108 which is adjustably secured in a sliding member 110 by means of a gib 112 and a hand screw 114. The member 110 is reciprocated within a groove 116 in an upright part of the machine frame 30 by means of a cam roll 118 engaging a cam groove 120 formed in the face of the gear 57. The movements of the tube 106 are such that the tubes comes into engagement with the wrapper as the tea is being discharged from the measuring disk. Further depression of the tube forms the bag shaped package in which the tea is retained and after removal of the tube by its upward motion the bag is closed to form the desired package.

The bag forming mechanism consists of a rotatable turret having a top plate 124 (see Figs. 13, 14 and 15) which carries a plurality of wrapper clamping members indicated generally at 126, 128, 130 and 132. These devices are in the form of intermeshing jaws and when opened in the position indicated at 126 are able to accommodate the tube 106 which passes downwardly therethrough. At this time, a predetermined length of wrapper has been stretched over the device 126 so that upon the downward motion of the tube the parts assume the relative positions indicated in Fig. 25 where the wrapper is indicated at 134 and the charge of tea which has passed down through the tube at 136. Upon the retraction of the tube the jaws are permitted to close upon the wrapper to form the bag-shaped package. The turret is then rotated one-quarter revolution at a time to carry the member 126 successively through positions 128, 130 and 132, there being provision for automatically opening the jaws while passing from position 130 to 132 to allow the bag to be removed. The illustrated machine employs four of the clamping members, each one of which passes successively through the same cycle of movements. It will be observed that each of the four clamping members consists of a pair of intermeshing hollow rectangular jaws 138 each carried by an arm 140, the separate arms being pivoted to the turret plate at 142 and 144. The operation of the clamping members is analogous to that of an iris diaphragm, the hollow rectangular jaws 138 being adapted to receive the tube 106 therethrough when the rectangular openings are in register, as at position 126, and being adapted to close and engage the mouth of the bag, as at position 128. The particular construction of the intermeshing members is indicated in elevation in Fig. 15 and in section in Fig. 16. One of the members consists of a top plate 148 and a relatively thicker bottom plate 150, the two plates being separated by a spacer 151, which extends only through the length of the arm 140. The bottom plate 150 is separated from the top of the turret by a second spacer 152. The other jaw member consists of top and bottom plates 153 and 154 separated by a spacer 155, the bottom plate being mounted directly above the turret so that the hollow rectangular portions of the two members may intermesh, as shown in Fig. 15, leaving a slight space between the top plate 153 of one of the members and the bottom plate 150 of the other member to allow the admission of a cutting disk 156 (Figs. 2, 13 and 26) driven by a shaft 157 from a motor 158 bracketed to the machine frame, the cutting disk operating to sever superfluous cloth from the mouth of the bag as the clamping member passes from position 126 to 128. In order to open and close the clamping members, a plurality of actuating disks 160 are rotatably mounted in depressions in the turret plate 124, each disk being secured to a stud 161 journaled in the turret top. Each of the disks is provided with a pair of cam slots 162 into which depend pins 164 connected to the arms 140 of the clamping devices. It will be seen that when the disks are rotated into the position indicated in Fig. 14, the clamping members will be retained outward, while if the disks are rotated in a counter-clockwise direction the pins 164 will be drawn toward each other, thereby closing the clamping jaws. In order to provide automatically for the actuation of the disks, each disk is connected through the stud 161 to a latch disk 166 on the underside of the turret plate. This latch disk is provided with a peripheral notch 167 within which is adapted to be received a latch lever 168 which is pivoted to the underside of the turret plate at 169. A spring 170 connected between pins at the periphery of the disk 166 and on the latch lever 168 tends normally to urge the latch inwardly in position to engage the notch and also to urge the disk 160 into such position that the clamping members will be closed. It will be apparent therefore that upon disengaging the latch, the disk will immediately tend to rotate counter-clockwise and close the clamping members. The latch is opened at the limit of the downward movement of the tube 106, in order that the jaws may close upon the wrapper and hold it from following the tube when the tube is retracted, and so that when the tube is removed entirely from the jaws they may further close to form the mouth of the bag, as shown in Fig. 27. This opening of the latch is caused to take place at the proper time by means of a reciprocating bar 172 which has a lug 174, in the path of which is interposed a second lug 176 depending from the latch lever 168. This bar 172 is also utilized for rotating the turret, as will be presently described. Upon passing from position 126 through 128 to 130 the clamping member is therefore closed but upon passing from position 130 to 132 it is necessary that the clamping member be opened to allow the finished package to be removed. This is accomplished by means of a nose 178 upon the disk 160 which engages a curved arm 180 secured to the main base 31 of the machine through an upright standard 182. This engagement of the nose 178 with the arm rotates the disk to open the clamping members, whereupon the latch 168 is urged into the notch 167 by the spring 170.

The rotation of the turret is carried out as follows: The turret consists of the top plate 124, heretofore described, a central hub 184 and a bottom plate 186, all mounted for rotation about a shaft 188 journaled in the machine base. The bottom plate 186 carries four pins 190, 191, 192 and 193, which are adapted to be successively engaged by a hook 196 upon the reciprocating bar 172. Upon the retraction of the bar from the position shown in Fig. 14, the pin 190 is carried over into the position occupied by pin 191, thereby imparting a quarter revolution to the turret. The bar 172 is pivoted to a bar 198, (Figs. 2 and 13) threaded into an adjustable block 200 which is connected to an arm 201 secured at its upper end to the rock shaft 52, so that motions of the cam roll 54 transmitted through the lever 53 are utilized for reciprocating the bar 172. A spring 202 connected between pins on the end of the rod 172 and the block 200 tends to urge the bar forwardly against the turret pin 190, also allowing an inclined face 204 of the hook 196 to pass by the pin 190 on the initial reciprocation of the rod 172. The turret is locked in each successive position to which it is moved by a locking lever 206 which has a notch 208 adapted to engage the pin 190. Upon the first movement of the bar 172 a depending pin 209 engages the surface of the locking lever and moves it away from the turret pin 190, thereby unlocking the turret and permitting rotation thereof when the bar is subsequently moved in the reverse direction. The locking lever is normally urged into locking position by means of a spring 210 connected between a post 211 and a projecting stud 212 on the locking lever (see Fig. 13). The locking lever 206 is pivoted upon a stud 214 which is eccentrically mounted in a circular plug 216 fitting an opening in the main base and attached to a hand operated collar 218, so that by rotating the collar 218 the pivot of the locking lever may be changed, thereby adjusting the position in which the turret may be locked. To recapitulate, the bar 172 on its first reciprocation (which is a motion toward the bottom of the sheet as viewed in Fig. 14) first slides past the pin 190 because of the inclined face 204 and then disengages the latch 168 and the locking lever 206. Upon removal of the tube 106 from the rectangular opening of the clamping member which takes place immediately thereafter, the bar 172 starts its movement in the opposite direction and being urged forwardly by means of the spring 202 allows the hook 196 to engage the pin 190 and rotate the turret a quarter revolution, thereby advancing each of the clamping members into the next successive position. The pin 193 moves into the position formerly occupied by pin 190 and is engaged by the notch 208 in the locking lever. In order that the movement of the turret shall be uniform the rotation is partly resisted by a leaf spring 220 rigidly mounted upon the machine base at 222 and caused to bear with adjustable pressure against the bottom turret plate 186 by means of a screw 224 mounted in an upright post 226 secured to the base, as indicated in Fig. 13.

The wrapper feeding and severing apparatus is shown in detail in Figs. 13, 20, 21 and 22 and is described as follows: The roll of cloth or other wrapping material 228 is mounted in brackets 230. The cloth then passes over an idler roll 232 to a stationary cloth guiding and holding device indicated generally at 234. This guiding device consists of a thick upper plate 236 and a spring lower plate 238 connected at their ends by brackets 240. The lower plate bears against the forward end of the upper plate, due to its spring pressure. The forward end of each plate is provided with a series of projections 242 indicated in Fig. 13. The brackets 240 are mounted in a frame 244 which is adjustable longitudinally of the base 31 of the machine by a bolt and slot connection 246 of the usual construction. The vertical position of the cloth guide 234 is adjustable by means of an eccentric 248 upon which the upper plate 236 rests. The eccentric is pivoted to the frame at 250 so that it may be manually rotated in an obvious manner to regulate the height of the guide 234. The cloth is presented by means of the stationary guide to a movable feeding mechanism which grasps the end of the cloth and pulls it forwardly a predetermined distance, whereupon a severing device cuts the cloth immediately in front of the guide 234. The movable feeding device comprises a rock shaft 252 (Figs. 21 and 22) which is journaled in a sleeve 254 connected to an upright arm 256. The upright arm is attached at the top to a web 258 (see Figs. 1 and 2) the web being provided with projections 260 pivoted upon studs 262 secured in the frame of the machine. One of the projections 260 carries an upright arm 264 by which the oscillating motion is imparted to the feeding device from the cam 56 by means presently to be described. The shaft 252 carries two cloth gripping members 266 (Fig. 13) which pass on opposite sides of the tube 106. Each gripping member comprises a pair of collars 268 pinned at the end of the shaft 252 at 270 and connected together by a web 272. Top and bottom spring gripper plates 274 and 276 are riveted to the web at 278. The rear end of each gripper plate is provided with a series of projections 280 which are adapted to pass between the projections 242 of the stationary guide member when the movable member is in its rearward position. The upper gripper plate 274 is provided with a series of pins 282. When the movable feeding member has moved to its utmost rearward position the gripper plates 274 and 276 are caused to spring together, thereby catching the end of the cloth presented by the stationary guide member upon the pins 282 so that upon the forward movement of the feeding member the cloth will be pulled out a predetermined distance. Upon the start of the next rearward movement of the feeding member, means are provided for releasing the cloth from between the gripper plates so that the wrapper may be formed by the descent of the tube 106 into the clamping member 126. In order to accomplish these results the gripper plate 274 is provided with rectangular openings 284 immediately forward of the spaces between the projections 280. A sliding cam device 286 lies in each slot, the construction of the cam device being such that when it is moved rearwardly it will engage the rearward ends of the openings 284 and spread the gripper plates apart. To this end the cam device has an inclined rear surface 288. Each cam device is provided with a rearwardly extending tongue 290 which is adapted to be struck by one of the projections 242 on the stationary guide member to push the cam device forwardly into the slot and allow the gripper members to close and engage the cloth when the feeding member is completing its rearward motion. The cam devices 286 are attached to a plate 289 which has a stem 291 curved upwardly through an opening 292 in the upper gripper plate. The end of the stem 291 lies in the space between the collars 268. In order to open the gripper plates, a ring 294 is provided which is rotatable over the shaft 252 between the collars and which has a shoulder 296 engaging the end of the stem 291. Each ring 294 (there being one ring between each pair of collars 268 at the ends of the shaft 252) has a notch 297 in its periphery which is engaged at the limit of the forward movement of the gripping members by a pawl 298 pivoted at 299 at the end of a block 300 carried by a stationary bifurcated arm 301 which is pivotally supported upon the studs 262. The block 300 is provided with a shoulder 302 beneath which the pawl arm is free to turn, and a compression spring 303 is provided between the pawl and the shoulder to urge the pawl upward toward the notch in the ring. A face plate 304 secured to the shoulder 302 covers the pawl arm. The bifurcated arm 301 is rigidly secured at its lower end by a yoke 305 secured at the top of the turret shaft and adjustably attached to the block 300 by a hand screw 306. It will be seen that as the cloth gripping members start their rearward movement, the engagement of the pawls in the notches 297 causes the rings 294 to rotate in a clockwise direction, thereby pushing on the stems 290 to cause the cam devices to open the gripper plates and release the cloth. The top gripper plate has riveted to it a spring stripper finger 307 which clears the pins 282 of the cloth when the upper and lower plates are separated. Upon the forward motion of the feeding device, the gripper members are maintained depressed by means of a stationary guide plate 308 secured to the machine frame, under which rides an arm 309 which is attached to one of the gripping members, the arm 309 being urged upwardly against the guide plate by means of a torsion spring 310 encircling the sleeve 252 and taking between the arm 256 and the lower gripper plate 276. This causes the cloth to be drawn from the stationary guide 234 in a horizontal direction so that the cloth will lie flat directly above the clamping device 126.

It will be understood that according to the terminology used above, the front part of the machine is at the turret end and the rear of the machine is at the cloth roll so that a motion of the feeding device to the right, as viewed in Fig. 21, is considered a rearward motion, whereas a motion to the left is considered a forward motion.

The cloth feeding devices are actuated through the motions of the lever 53, which, as above described, are also utilized to rotate the measuring disk and the turret. The lever 53 carries a block 312 which is connected by a link 313 with a second block 314 pivotally mounted upon an arm 315 which is pivoted upon a bracket 316 extending outwardly from the machine frame. The arm 315 carries a cam segment 317 having a cam groove 318 in which a cam roll 319 is received. The cam roll 319 is mounted upon the upper end of the arm 264 which is operatively connected with the cloth feeding arm 256 so that as the lever 53 is actuated by the cam roll 54, the arm 264 will be oscillated about the stud 262, thereby oscillating the arm 256 which carries the cloth feeding members. It will be seen that a counter-clockwise movement of the arm 315 about its pivot on the bracket 316 causes a forward movement of the cloth feeding devices, whereas a clockwise movement of the arm causes a rearward movement of the feeding devices. In order to permit adjustment of the amount of oscillation of the feeding members, the cam segment 317 is pivoted to the arm 315 at 320 and the segment is rigidly held in any desired position on the arm by means of a wing nut 321 which is used to tighten a notched clamping device 322 to clamp the segment against the arm, as clearly indicated in Fig. 11. It will be seen that since the pivot of the cam segment upon the arm 315 is approximately at the center of the path of the cam roll, the adjustment of the feeding devices will be taken up equally at both ends of the motion of the feeding devices, for example, an adjustment such as to give an increase of ten degrees in the oscillation of the arm 256 will allow the arm 256 to move forwardly an additional five degrees and also to move rearwardly an additional five degrees.

The cloth severing devices are mounted entirely upon the adjustable frame 244 and consist of a stationary knife 324 and a movable knife 325. The stationary knife 324 is supported upon dowel pins 326 and screws 327 passing through a web 328 which extends across the frame 244. A spring 329 encircling the screw 327 and bearing between the web and a wing nut 330 provides a yielding and adjustable mounting for the knife. The stationary knife is of the shape illustrated in Fig. 2, being slightly convex toward the rear of the machine and having the center of the cutting surface somewhat higher than the ends to permit positive shearing of the cloth. The cutting edge of the knife is disposed immediately forward of the end of the stationary cloth guide 234. The movable knife 325 is adjustable under a block 334 secured to an arm 336 pivoted at 338 upon the frame 244. The arm 336 is normally held downwardly by a spring 340. Referring to Fig 2, the movable knife is actuated by a bell crank lever having an upper arm 342 carrying a cam roll 344 which bears against the periphery of the cam 56. The lower arm 348 of the bell crank carries a pad 350 upon which rests the end of the movable knife arm 336. When the rise 352 of the cam strikes the roll 344 the movable knife is lifted, thereby severing the cloth against the stationary knife. The movable knife carries the cloth guide 234 along with it, the latter being free to rotate about its pivotal connection on the frame. The actuation of the cloth severing device takes place at the start of the rearward movement of the cloth feeding mechanism, just as the movable gripper plates are being separated to release the cloth.

The timing of the various motions will now be described with the aid of Figs. 23 to 27. It will be seen from Figs. 23 and 24 that the tube 106 is at its uppermost position and is ready to descend. The cloth which is indicated at 134 has now been drawn to the limit of its forward movement by the cloth gripping member 266, the center of the cloth lying directly under the tube 106 and above the clamping member 126. The tube 106 now begins its downward movement and, as it comes into engagement with the cloth, the gripper members 266 start their rearward movement, thereby releasing the cloth as previously described. The cloth cutting mechanism is actuated at this time to sever the cloth immediately in front of the stationary cloth guide. It will be seen that the cloth is always positively held in position, either by the cloth feeding devices or by the engagement of the tube 106 with the cloth. The cloth is not released by the feeding device until it has been securely engaged between the tube 106 and the clamping member 126. The tube continues its downward movement to the position indicated in Fig. 25, during which the measuring disk is rotated one sixth of a revolution to dump one of the measured charges of tea through the delivery tube into the wrapper. The movement of the tube depresses the cloth into the clamping jaws and bunches the edges of the wrapper up around the tea. When the tube is at the limit of its downward movement, the cloth feeding member has completed its rearward motion and is now in position to engage the cloth preparatory to another feeding operation, as indicated in Fig. 13. At this time the reciprocating bar 172 has moved to unlatch the clamping jaws and also to unlock the turret. The tube is now retracted from the clamping member, thereby permitting the jaws to close about the top of the wrapper to form the bag-shaped package. The bar 172 then moves to advance the turret one quarter of a revolution to carry the clamping member from position 126 to 128, thereby permitting severing of the top of the bag by the cutting disk, as indicated in Fig. 26. Meanwhile the cloth gripper members 266 have undergone their forward movement, which is permitted as soon as the tube 106 is withdrawn from the clamping member. A new clamping member is in position 126, the parts being again placed in the relation shown in Fig. 23 preparatory for another wrapping operation. Another quarter revolution of the turret carries the clamping member into the position 130 at the front of the machine where the mouth of the bag may be conveniently tied in any desired manner to form the package shown in Fig. 28. Another advance of a quarter of a revolution carries the clamping member to position 132 where the jaws are automatically opened to permit removal of the finished bag.

It will be observed that all the parts may be adjusted to permit packaging of any desired amount of material. If it becomes necessary to change the size of wrapper, the amount of oscillation of the cloth feeding device may be adjusted as previously described by rotating the cam segment 317. It is desirable that the center of the wrapper when drawn completely forward should lie directly above the center of the clamping jaws. This is automatically taken care of by the fact that the rotation of the cam segment 317 takes up one-half of the adjustment at each end of the movement of the feeding member. However, an adjustment of the feeding member necessitates a change in the position of the stationary arm 301 and also in the position of the stationary cloth guide 234. The former adjustment is carried out by means of the hand screw 306, it being necessary only to move the arm 301 so that the pawl 298 engages the ring 294 when the cloth feeding member is placed at its forwardmost position. The feeding member may then be moved to its rearward limit and the frame 244 which carries the stationary guide moved forwardly until it engages the feeding member. To adjust the depth of the package it is only necessary to adjust the conveying tube 106 by means of the gib 112 as hereinbefore described.

While it is preferred to employ the specific construction and arrangement of parts shown and described, it will be understood that this construction and arrangement is not essential except so far as specified in the claims and may be changed or modified without departing from the broader features of the invention.

The invention having been described, what is claimed is:

1. A machine for wrapping loose material having, in combination, a rotatable turret, a plurality of wrapper clamping devices on the turret, means for feeding a flat wrapper over one of the clamping devices, means for depressing the wrapper into the clamping device to receive a predetermined charge of material to be wrapped, means for closing the clamping device about the wrapper to form a bag in which the material is retained, and means for rotating the turret to bring successive clamping devices into position to receive the material.

2. A wrapping machine having, in combination, a measuring device, a reciprocating delivery tube into which the measuring device discharges, a rotatable turret, a plurality of wrapper clamping members mounted on the turret and adapted when open to allow the reciprocating tube to pass downwardly therethrough, means for rotating the turret to bring successive clamping members into position beneath the tube, means for feeding a length of wrapper between the clamping member and the tube whereby the wrapper is depressed upon the downward movement of the tube, means for discharging an amount of material to be wrapped from the measuring device to the wrapper when the wrapper is thus depressed, and means for closing the mouth of the wrapper to form a bag about the material when the tube is withdrawn.

3. A machine for wrapping loose material having, in combination, a rotatable turret, a plurality of wrapper clamping devices mounted on the turret, each device consisting of a pair of intermeshing jaw members, a latch device for holding the jaw members open, means for feeding a length of wrapper above one of the clamping devices, means for depressing the wrapper into the clamping device to receive a charge of material to be wrapped, means for opening the latch to allow the clamping jaws to close above the wrapper to form a bag, and means for rotating the turret to bring successive clamping members into position to receive the material.

4. A machine for wrapping loose material having, in combination, means for measuring a predetermined amount of the material, means for feeding a length of flat wrapper in position to receive the measured amount of material, bag forming devices for bunching the wrapper about the material and for closing the top of the wrapper to form a bag-shaped article, a rotating cam, a lever oscillated by the cam, and connections from the lever for operating the measuring means, the bag forming devices, and the feeding devices.

5. A wrapping machine having, in combination, a hollow plunger, means for reciprocating the plunger, means for feeding a flat wrapper to be engaged by the plunger, means for delivering a charge of material to be wrapped through the plunger to the wrapper, and a pair of clamping jaws having registering openings to receive the plunger and adapted to be moved into non-registering positions to close the mouth of the wrapper when the plunger is withdrawn from engagement therewith.

6. A wrapping machine having, in combination, a hollow plunger, means for reciprocating the plunger, means for feeding a flat wrapper to be engaged by the plunger, means for delivering a charge of material to be wrapped through the plunger to the wrapper, and a pair of pivoted clamping jaws having when open registering openings to receive the plunger and adapted to close about the plunger to form a bag-shaped package as the plunger is withdrawn from engagement with the wrapper.

7. A wrapping machine having, in combination, a hollow plunger, means for reciprocating the plunger, means for feeding a flat wrapper to be engaged by the plunger, means for delivering a charge of material to be wrapped through the plunger to the wrapper, a pair of pivoted clamping jaws having when open registering openings to receive the plunger, cam means for controlling the jaws, means permitting the jaws to close to bunch the mouth of the wrapper to form a bag-shaped package, and means for subsequently operating the cam means to open the jaws and discharge the package.

8. A wrapping machine having, in combination, a hollow plunger, a wrapper forming mechanism comprising a pair of pivoted clamping jaws having registering openings to receive the plunger, means for feeding a flat wrapper between the clamping jaw and the plunger, a cam for controlling the clamping jaws, a spring normally urging the clamping jaws toward closed position, a latch for the cam to hold the jaws in open position, means for reciprocating the plunger to cause the wrapper to be engaged by the clamping jaws, and means for releasing the latch to close the clamping jaws upon the wrapper to form a bag-shaped package.

9. A wrapping machine having, in combination, means for measuring a predetermined amount of material to be wrapped, means for feeding a length of wrapper into position to receive the material, means for forming a wrapper about the material to form a bag-shaped package, a cutter, and means for relatively moving the cutter and the package to trim the mouth of the package.

10. A wrapping machine having, in combination, means for measuring a predetermined amount of material to be wrapped, means for feeding a length of wrapper into position to receive the material, clamping devices for engaging the wrapper and forming a wrapper about the material to form a bag-shaped package, a cutter, and means for relatively moving the clamping devices and the cutter to trim the mouth of the package.

11. A wrapping machine having, in combination, means for measuring a predetermined amount of material to be wrapped, a pair of clamping jaws for closing the wrapper about the material to form a bag-shaped package, each clamping jaw consisting of a pair of plates adapted for engagement with similarly formed plates of the other clamping jaw to provide a space between the plates of the jaws, a cutter adapted to enter said space to trim the mouth of the package, and means for relatively moving the cutter and the clamping jaws.

12. A wrapping machine having, in combination, a hollow plunger, a plurality of wrapper forming mechanisms, means for presenting successive wrapper forming mechanisms in operative relation to the hollow plunger, means for feeding a flat wrapper between the plunger and the wrapper forming mechanism in operative position, means for reciprocating the plunger to engage the wrapper with the wrapper forming devices, means for feeding the material to be wrapped through the plunger, means for actuating the wrapper forming devices to close the mouth of the wrapper about the plunger and to form a bag-shaped package upon the withdrawal of the plunger, and means for discharging the package as a subsequent wrapper forming mechanism is presented to the plunger.

13. A wrapping machine having, in combination, a rotatable turret, wrapper forming mechanisms carried by the turret, a hollow plunger, wrapper feeding mechanisms, and means for intermittently rotating the turret to present successive wrapper forming mechanisms in operative relation to the plunger.

14. A wrapping machine having, in combination, a rotatable turret, a plurality of wrapper forming mechanisms each including a pair of clamping jaws carried by the turret, a hollow plunger, wrapper feeding mechanism, means for opening the clamping jaws to receive the plunger and to engage the wrapper, means for delivering a charge of material to be wrapped through the plunger, means for closing the clamping jaws to form a bag-shaped package, means for intermittently rotating the turret to present successive wrapper forming mechanisms to the plunger, and means for discharging the completed package upon rotation of the turret.

15. A wrapping machine having, in combination, a rotatable turret, a plurality of wrapper forming mechanisms each including a pair of clamping jaws carried by the turret, a hollow plunger, wrapper feeding mechanism, means for opening the clamping jaws to receive the plunger and to engage the wrapper, means for delivering a charge of material to be wrapped through the plunger, means for closing the clamping jaws to form a bag-shaped package, means for intermittently rotating the turret to present successive wrapper forming mechanisms to the plunger, and a cutter adapted to engage with the mouth of the package upon rotation of the turret for trimming the package.

16. A wrapping machine having, in combination, means for measuring a predetermined amount of material to be wrapped, wrapper feeding means, means for conveying the material from the measuring means to the wrapper including a reciprocating hollow plunger adapted to engage with the wrapper, a rotatable turret, a plurality of wrapper forming mechanisms carried by the turret and adapted to be successively moved into operative position with relation to the plunger, means for reciprocating the plunger to engage the wrapper with the wrapper forming mechanisms, means for intermittently rotating the turret, and means for locking the turret after each rotation and during engagement of the plunger with one of the wrapper forming mechanisms.

17. A wrapping machine having, in combination, wrapper feeding means, a rotatable turret, a plurality of wrapper forming mechanisms carried by the turret and adapted to engage a wrapper to form a bag-shaped package, a reciprocating rod, and means on the turret adapted to be engaged by the rod for intermittently rotating the turret to present successive wrapper forming mechanisms in operative relation to the wrapper.

18. A tea bagging machine having, in combination, a pair of bag forming members, each member having a hole to receive the wrapper and tea contained therein, means for moving the members into position with relation to each other so as to have their holes in registering position and into position to bring the holes into non-registering position in order to bunch the wrapper to form the package.

19. A tea bagging machine having, in combination, a plurality of pairs of bag forming members each provided with a hole, means for moving the members into position with the holes in register to receive the wrapper and tea contained therein, and into non-registering position to bunch the wrapper about the tea, and a rotary carrier for the bag forming members.

20. A tea bagging machine having, in combination, a pair of wrapper engaging arms each provided with a hole, a rotary carrier for said arms, means for relatively moving the arms into position with their holes in register at one position of the carrier and for relatively moving them into non-registering position to close the wrapping material around the tea at another position of the carrier and for relatively moving the arms to release the tea bag at still another position of the carrier, and means for cutting off the surplus wrapping material during movement of the carrier.

21. A tea bagging machine having, in combination, a turret, means for rotating the turret step by step, said turret being provided with two pivoted wrapper arms provided with holes, means for relatively moving the arms to bring the holes into register to receive the wrapper and tea contained therein and for moving the arms into non-registering position in order to neck the wrapping material about the tea and to hold the bag in position, means for cutting off the surplus wrapping material, said wrapper arms acting to hold the tea bag and to move it into position to be tied, and means for separating the arms to release the tea bag.

22. A tea bagging machine having, in combination, a turret provided with a plurality of pairs of bag forming members each provided with a hole, means for rotating the turret step by step, means for moving the bag forming members into position with their holes in register at one position of the turret and then into a position of non-registry at the next position of the turret, means for cutting off the surplus material from the bag, means for holding the bag forming members in position while the bag is tied, and means for moving the bag forming members into position to release the bag.

23. A tea bagging machine having, in combination, a turret, means for presenting a piece of bag material to the turret at one position, means for supplying tea to the piece of bag forming material in that position, means for forming the bag forming material into a bag enclosing the tea and for progressively moving the turret to carry the bag thus formed forward, a knife for trimming the surplus material from the mouth of the bag, the bag forming means acting to hold the bag throughout about a half-revolution of the turret to permit the operative to tie a string around the neck of the bag while it is held by the bag forming members, and for releasing the bag thereafter and opening the bag forming members again.

24. A tea bagging machine having, in combination, a turret provided with a plurality of bag forming members, means for presenting a piece of bag forming material to the turret at one position thereof, means for supplying tea to the bag forming material thus presented, said means cooperating with the bag forming members to form a bag of tea and to withdraw therefrom, said machine having provision for causing the bag forming members to close the mouth of the bag and to hold the same while it is being transported to the second position of the turret, bag trimming means for trimming the bag between the position of formation and the second position of the turret, said bag forming members acting to hold the bag after it has been trimmed and while it is moved by the turret to a third position where it is adapted to be tied by a string around its neck, said members acting, during movement of the turret to fourth position, to open the bag forming members and allow the bag to fall.

25. A machine for packaging loose material having, in combination, a plunger for applying pressure to the central portion of a blank of material, means for supporting the walls of the material not engaged by the plunger to form substantially continuous bottom end and longitudinal walls and an open top end, means for delivering material to be wrapped through the plunger, and means for circumferentially gathering the material of the longitudinal walls of the container near said open end.

26. A machine for packaging loose material having, in combination, means for supporting a blank of cloth, a plunger for applying pressure to the central portion of the blank to form an elongated hollow body open at one end, means for supplying material to the package through the plunger, and means for applying circumferential pressure to said body near the open end thereof to form a neck and close the package.

27. A machine for wrapping loose material having, in combination, a stationary wrapper guide, a movable wrapper feeding member, wrapper forming devices including a reciprocating plunger adapted to engage the wrapper presented thereto by the feeding member, means for moving the wrapper feeding member toward the stationary guide upon engagement of the plunger with the wrapper, said means having provision for releasing the previously fed wrapper, and means for moving the wrapper feeding member away from the stationary guide when the plunger is moved out of the path of the wrapper feed.

28. A machine for wrapping loose material having, in combination, wrapper forming devices including a hollow reciprocating plunger and plates through which the plunger is depressed, a stationary wrapper guide, a removable wrapper feeding member having a pair of plates between which the wrapper is gripped, the plates consisting of projections which pass on opposite sides of the reciprocating plunger, means for moving the wrapper feeding member to present a length of wrapper to the wrapper forming devices, and means for moving the wrapper feeding member toward the stationary guide when the plunger is in engagement with a previously fed wrapper.

29. A machine for bagging loose material having, in combination, automatic mechanism for feeding bag forming material into the machine, bag forming and filling mechanism cooperating therewith to form and fill successive bags with loose material from the bag forming material thus fed, and rotatable conveying means for engaging and closing the mouth portions of the filled bags and for holding the filled bags during rotary movement of the said conveying means.

30. A machine for bagging loose material having, in combination, a rotatable turret member comprising a plurality of bag holding and closing members for filled bags, means for rotating said turret member, bag filling mechanism for filling the bags with loose material, and means for automatically feeding bag forming material from a supply thereof into operative position with relation to the bag filling mechanism.

31. A machine for bagging loose material having, in combination, means for automatically forming successive bags from a supply of bag forming material, bag filling mechanism cooperating therewith to fill successive formed bags, an automatic bag closing mechanism cooperating with said filling mechanism to close the mouths of the bags after they have been filled and including a rotatable member provided with a plurality of bag holding and closing members thereon for closing the mouths of the filled bags and moving them with the rotatable member.

ANALDO M. ENGLISH.